2,720,492

ACTIVATED ALUMINA FREE OF FINES

Philip J. Ehman, Marinette, Wis., assignor to Ansul Chemical Company, Marinette, Wis., a corporation of Wisconsin No Drawing. Application November 24, 1952, Serial No. 322,360

3 Claims. (Cl. 252—194)

This invention relates to comminuted activated alumina free of fines and to a method of removing fines from large pieces of activated alumina or from other large particles containing activated alumina as the main constituent.

Activated alumina is used as a desiccant in the chemical industry, in the refrigeration industry, in the air-conditioning industry and anywhere that dry gases or liquids are required. It is also used in large quantities as a catalyst. It can be obtained in various sizes and in such shapes as pellets, tablets and lumps.

These various forms of activated alumina show considerable attrition, with the production of a very fine powder, when subjected to a rubbing action, such as is obtained during handling, transporting and sometimes in use. In almost all cases this fine powder is objectionable. When drying refrigerants, it will plug capillary tubes and expansion valves. When used in air-conditioning it will be carried away as a dust in the air being dried. When drying liquids it will appear as a suspension.

A common method of removing these fines is by the use of a fine pore filter. These filters become easily plugged, which requires cleaning or changing, each of which can be an expensive operation. Another method of removing these fines is by washing them out with an inert liquid or gas. This also can be an expensive process and in addition it never completely removes the fines. Still another method of removing these fines is by a screening operation. This method is only partially satisfactory since the screening operation itself produces fines because of the rubbing action involved.

An object of this invention is to provide a simple and inexpensive method of removing fines from activated alumina.

Another object of this invention is to remove the fines from alumina while the alumina is in an activated condition, without destroying the catalyst activity or desiccant properties of the alumina.

Still another object of this invention is to provide a method of removing fines from activated alumina, which results in particles of increased resistance to abrasion.

I have discovered that when coarse particles, for example particles retained on a Tyler standard 40 mesh screen, of alumina are intimately mixed with a very small amount of pulverized phosphoric anhydride a reaction occurs between the residual water in the alumina and the phosphoric anhydride to form a very thin layer of phosphoric acid which in turn combines with the alumina fines, with probable formation of an adherent coating of aluminum phosphate followed by crystallization on the surface of the alumina, forming a dust-free particle and one with decided resistance to abrasion.

I have found that the amount of phosphoric anhydride required varies with the water content of the alumina. In general, the phosphoric anhydride content may range from about 0.05 per cent to about 5 per cent by weight. When the alumina has been activated by heating for several hours at 400 to 600° F. which leaves about 5 to 7 per cent by weight water in the alumina, the amount of phosphoric anhydride required is less than 0.5 per cent by weight. When water is added or the mixing performed in moist air additional quantities of phosphoric anhydride can be added, but the alumina then requires reactivation. In most cases 0.5 per cent by weight is sufficient to eliminate fines and produce a surface of increased resistance to abrasion, but as much as 5 per cent by weight can be used and still remain within the scope of this invention. However, excess or unadhered phosphoric anhydride is undesirable in the final product as it is important that all the phosphoric anhydride present be superficially distributed and directly adhered to the surface of the activated alumina particles.

The following is a specific illustrative embodiment of my invention. 200 grams of one-eighth inch alumina balls, which had been heated overnight at 400° F., were intimately mixed with 1.5 grams of powdered phosphoric anhydride, in a closed container such as an Erlenmeyer flask. A small amount of the phosphoric anhydride adhered to the walls of the flask but the remainder adhered to the alumina balls. The resulting balls were dust-free on shaking and showed a decided luster. 147 grams of this treated alumina was packed tightly in a 12 cu. in. drier cartridge. Liquid methyl chloride was then passed through the alumina for three periods of thirty minutes each at the rate of 5.5 pounds of methyl chloride per minute. A filter paper placed in the liquid methyl chloride line was used to catch the fine alumina carried along by the methyl chloride. The filter paper was weighed at the end of each thirty minute period and a new filter paper used each time. The cartridge was then placed in a shaking machine for 55 minutes and after shaking, the washing with methyl chloride was repeated for three thirty minute periods. The entire operation was repeated using the same apparatus and procedure except that the cartridge was charged with 137 grams of the same alumina that had not been treated with phosphoric anhydride. The results in per cent by weight of attrition are as follows:

|  | $P_2O_5$ Treated Aluminum | | | Untreated Aluminum | | |
| --- | --- | --- | --- | --- | --- | --- |
|  | 1st 30 mins. | 2nd 30 mins. | 3rd 30 mins. | 1st 30 mins. | 2nd 30 mins. | 3rd 30 mins. |
| Before shaking | 0.003 | none | none | 0.010 | 0.006 | 0.003 |
| After shaking | none | none | none | 0.110 | 0.006 | 0.007 |

These results show much less attrition with the treated alumina than with the untreated alumina under simulated refrigerant drying conditions.

As another example, 100 grams of phosphoric anhydride treated alumina was shaken on a 100 mesh screen for 5 minutes. The attrition amounted to 0.06 per cent by weight. 100 grams of the same alumina, but untreated, showed 0.7 per cent by weight of attrition or about ten times as much as the treated alumina.

My invention may be applied to a varying range of particle size of the activated alumina or compositions containing activated alumina as the essential component within the limits herein indicated and within the ranges of phosphoric anhydride as fully described. All such compositions are intended to be included within the scope of the appended claims.

I claim:

1. A free-flowing comminuted desiccant consisting of free-flowing comminuted activated solid alumina particles of a size retained on a Tyler standard 40 mesh screen substantially free of fines, said alumina particles having an adherent exterior coating formed thereon by intimately mixing from about 0.05 to about 5% by weight of pulverized phosphoric anhydride with the initially activated alumina particles having a residual water content to react with said residual water and form an adherent dust-free surface coating on said particles.

2. A free-flowing comminuted desiccant consisting of free-flowing comminuted activated solid alumina particles substantially free of fines, said alumina particles having an adherent exterior coating formed thereon by intimately mixing from about 0.05 to about 5% by weight of pulverized phosphoric anhydride with the initially activated alumina particles having a residual water content to react with said residual water and form an adherent dust-free surface coating on said particles.

3. A free-flowing comminuted desiccant consisting of free-flowing comminuted activated solid alumina particles of a size retained on a Tyler standard 40 mesh screen substantially free of fines, said alumina particles having an adherent exterior coating formed thereon by intimately mixing about 0.5% by weight of pulverized phosphoric anhydride with the initially activated alumina particles having a residual water content to react with said residual water and form an adherent dust-free surface coating on said particles.

References Cited in the file of this patent

UNITED STATES PATENTS

| | | |
|---|---|---|
| 1,913,938 | Metzger et al. | June 13, 1933 |
| 2,324,079 | Greger | July 13, 1943 |
| 2,625,516 | Metzger et al. | Jan. 13, 1953 |